United States Patent
Pugin

[15] 3,697,526
[45] Oct. 10, 1972

[54] CRYSTALLINE PERYLENETETRACARBOXYLIC ACID DIBENZOYLHYDRAZIDE

[72] Inventor: Andre Pugin, Riehen, Switzerland
[73] Assignee: Ciba-Geigy AG, Basil, Switzerland
[22] Filed: Nov. 17, 1970
[21] Appl. No.: 90,423

[30] Foreign Application Priority Data
Nov. 28, 1969 Switzerland............17777/69

[52] U.S. Cl.............260/281, 106/288 Q, 260/37 NP
[51] Int. Cl...........................................C07d 39/00
[58] Field of Search......................................260/281

[56] References Cited
FOREIGN PATENTS OR APPLICATIONS

| | | |
|---|---|---|
| 1,580,622 | 9/1969 | France......................260/281 |
| 1,580,623 | 9/1969 | France......................260/281 |
| 1,147,702 | 4/1963 | Germany..................260/281 |

Primary Examiner—Donald G. Daus
Attorney—Wenderoth, Lind & Ponack

[57] ABSTRACT

Crystalline perylenetetracarboxylic acid dibenzoylhydrazide is prepared by condensing perylenetetracarboxylic acid dianhydride with benzhydrazide in the presence of non-basic solvents or in the presence of a mixture of basic and non-basic solvents. The compound is used as pigment.

1 Claim, No Drawings

CRYSTALLINE PERYLENETETRACARBOXYLIC ACID DIBENZOYLHYDRAZIDE

DETAILED DESCRIPTION

The invention relates to a new crystal form of perylene-3,4,9,10-tetracarboxylic acid dibenzoylhydrazide, to its use for the pigmenting of high-molecular organic material, and to processes for the production thereof.

Pigments of the perylenetetracarboxylic acid dihydrazide series are already known from the Belgian Pat. No. 720 207. They are produced by using preferably basic solvents, such as quinoline or pyridine, as solvents or diluents for the starting materials, namely perylenetetracarboxylic acid or its acid derivatives and the hydrazides to be reacted with the latter, or perylenetetracarboxylic acid dihydrazide and the acids or acid derivatives to be reacted therewith; and carrying out the reaction at high temperatures. The use of non-basic solvents is mentioned quite generally, and, moreover, the production of a dyestuff from perylene-3,4,9,10-tetracarboxylic acid dianhydride and the hydrazide of 2,4-dichlorophenoxyacetic acid in trichlorobenzene at about 220°C is described. No chemically homogeneous product is, however, thereby obtained. If the methods described in the examples are applied, whereby basic solvents are used for the production of perylene-3,4,9,10-tetracarboxylic acid dibenzoylhydrazide, then a yellowish red crystal form is obtained, denoted as the α-form, the color strength and fastness to light of which could be advantageously improved.

Suprisingly, it has now been shown that perylenetetracarboxylic acid-dibenzoic acid hydrazide is obtained in an appreciably more deeply colored crystal form, which yields considerably more light-fast and purer bluish red printings and which is called the β-form, if specific conditions, during its production, with respect to the reaction medium and the reaction temperature are applied.

Such cases of polymorphism with regard to the hydrazides of perylenetetracarboxylic acid have not been known hitherto. Of the compounds mentioned in the Belgian patent, the stated product is an exception.

The perylene-3,4,9,10-tetracarboxylic acid benzoylhydrazide according to the invention corresponds to formula I:

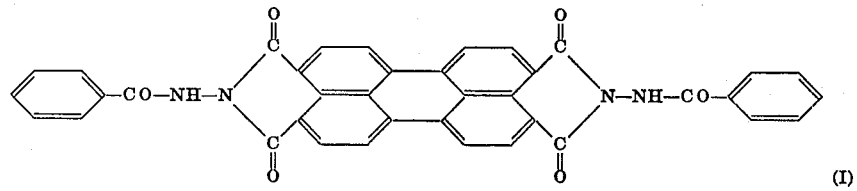

(I)

and has an X-ray spectrum with very strong lines at 3.31 A, 3.37 A, 5.72 A and 17.5 A, a strong line at 4.375 A, medium lines at 3.65 A, 4.67 A and 7.315 A, medium-weak lines at 3,43 A, 3.92 A and 4.50 A, and weak lines at 3.01 A, 5.10 A, 6.56 A and 8.67 A.

To determine the characteristic lines corresponding to the interlattice-plane distances, X-ray diffraction diagrams were obtained with a counting tube goniometer from the firm Philips, Eindhoven, using  radiation. The diffraction angles were converted to interlattice-plane distances in angstroms. The given values have an accuracy of about 1 percent.

This crystalline modification called the β-form also has characteristic absorption maxima in the infrared spectrum at 11.11 μ, 12.33 μ, 12.58 μ, 13.55 μ and 14.10 μ, whilst the α-form has the following characteristic absorption maxima at 11.37 μ, 12.37 μ, 12.48 μ, 12.62 μ, 13.62 μ and 13.96 μ.

This bluish red pigment can be worked into printing inks, lacquers and synthetic materials, and has outstanding fastness to light, weather, heat, crosslacquering, and migration. A remarkable aspect is that it maintains its crystal form and its bluish red shade when incorporated into high-melting polymers.

It is produced according to the invention by stirring either perylene-3,4,9,10-tetracarboxylic acid dianhydride and benzhydrazide at a temperature of 170° to 300° C in the presence of organic, non-basic solvents, or in the presence of a mixture of basic and non-basic solvents, in which the proportion of basic solvent can be at most 97 percent; or perylene-3,4,9,10-tetracarboxylic acid dihydrazide of formula II:

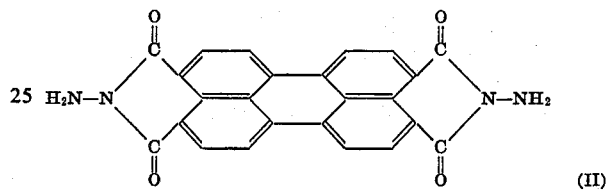

(II)

with benzoyl chloride, e.g., at a temperature of 80° to 250° C, or with benzoic acid anhydride, e.g., at a temperature of 160° to 250° C, in the presence of a non-basic organic solvent, whereby small amounts of zinc chloride as well as of basic solvent, such as pyridine or quinoline, can also be present. To react one mole of perylenetetracarboxylic acid derivative, at least 2 moles of benzoic acid derivative have to be used. If this reaction is done in the absence of basic solvents, then at least 3 moles of the benzoic acid derivative are used. The amount of basic solvent must be smaller than one mole per mole of benzoic acid chloride; zinc chloride may only be present in amounts smaller than 1/10 of the weight of perylenetetracarboxylic acid dihydrazide. The reaction from the hydrazide of formula II can be advantageously performed in the course of the production of the perylenetetracarboxylic acid dihydrazide from perylenetetracarboxylic acid dianhydride and hydrazine hydrate by adding to the fully reacted mixture of these starting materials the required amount of benzoyl chloride. Instead of the non-basic solvent such as, in particular, o-dichlorobenzene, trichloro-benzene, nitrobenzene, chloronaphthalene, carbon tetrachloride, tetrachloroethane and dimethylformamide, it is also possible to use an excess of benzoyl chloride, whereby the temperature for the reaction can then be 80° to 140° C. Furthermore, the condensation of perylene-tetracarboxylic acid dihydrazide with benzoyl chloride can also be performed in the presence of a basic organic solvent alone, provided that a reaction temperature of below 100° C is maintained. Finally, also the condensation of perylenetetracarboxylic acid dihydrazide with benzoic acid or benzoic acid ester, such as -ethyl or -methyl ester, at a temperature of 100° to 200° C in the presence of polyphosphoric acids leads to the desired β-crystal form of the pigment. This procedure is advantageous inasmuch as the reaction product is obtained in a fine grain size and requires no further aftertreatment, such as crushing. In the case of the other methods of production, a coarse crystalline crude product is usually obtained which, after filtering, has to be subjected further to grinding with salt or sand, for it to be made sufficiently fine for further use. Concentrated sulphuric acid, in contrast to polyphosphoric acid, causes even in small amounts the splitting of the pigment, or prevents its formation.

If condensation is carried out under other conditions, then the less colored, colored yellowish red and less light-fast α-crystal form is obtained which has an X-ray spectrum with very heavy lines at 3.43 A, 7.97 A, 9.41 A and 16.8 A, a heavy line at 3.27 A, medium-heavy lines at 3.35 A and 3.97 A, medium lines at 3.18 A, 4.34 A, 4.95 A, 5.32 A and 6.76 A, medium-weak lines at 3.11 A, 3.53 A, 4.44 A, 4.69 A and 5.89 A, as well as weak lines at 2.95 A, 3.02 A and 3.60 A.

Such other conditions are, in particular, the reaction of perylenetetracarboxylic acid dianhydride with benzhydrazide at temperatures of 170° to 250° C without the presence of a solvent or diluent, or in the presence of only one basic solvent such as quinoline or pyridine; also the reduction of perylenetetracarboxylic acid dihydrazide with benzoyl chloride in the presence of fairly large amounts of a basic solvent at a temperature of 100° to 250° C, or in the presence of a non-basic solvent and fairly large amounts of zinc chloride, or in the presence of an excess of benzoyl chloride, without another solvent or diluent, at a temperature of over 150° C.

The new compound is suitable for the dyeing of high-molecular organic materials, e.g., for the pigmenting of lacquers, also metal-effect-lacquers, plastic masses such as hard or softener-containing polyvinyl chloride, polyurethane, polycarbonate, polystyrene, polyacrylonitrile, polyolefins; for the spinning-dyeing of synthetic fibers; or as printing ink. The pigment may be used direct, or after conversion into a finely divided form.

The temperatures are given in degrees Centigrade in the following examples.

EXAMPLE 1

An amount of 39.2 g of perylene-3,4,9,10-tetracarboxylic acid dianhydride is stirred with 41 g of benzhydrazide in 200 ml of 1-chloronaphthalene for 1½ hours at 230° – 235°, whereby the water forming during the reaction is continuously distilled off. The red suspension is filtered off at 150°, and the residue washed hot with dimethylformamide. In this manner are isolated 57 g of a crude pigment which yields, after being ground with sodium chloride or calcium chloride, a bluish red product which, as pigment, possesses excellent fastness to light, weather, heat, over-blocking, and migration.

Both the crude pigment and the pigment ground with salt have identical X-ray diagrams with especially intensive lines at 3.31; 3,37; 5.72 and 17.5 A, a strong line at 4.375 A, medium lines at 3.65; 4.67 and 7.315 A, medium-weak lines at 3.43; 3.92 and 4.50 A, as well as weak lines at 3.01; 5.10; 6.56 and 8.67 A.

EXAMPLE 2

An amount of 18.55 g of perylene-3,4,9,10-tetracarboxylic acid dianhydride is heated with 10 g of hydrazine hydrate in 100 ml of o-dichlorobenzene to 70°–80, and the whole held at this temperature for 2 hours. The internal temperature of the suspension is then raised, with the distilling off of water and excess hydrazine hydrate, to 170°. At this temperature are then added dropwise, within 30 minutes, 18 ml of benzoyl chloride; the temperature is subsequently maintained between 170° and 175° for 3 hours. The suspension is filtered off at 100°, and washed with o-dichlorobenzene, dimethylformamide, water, and acetone. The residue is boiled out for 45 minutes in 150 ml of dimethylformamide. After filtering off at 100° and washing with acetone, 27.5 g of a crude pigment are obtained which has the same X-ray diagram as the crude pigment of Example 1.

After being ground with salt, the pigment is distinguished by a strong bluish red shade and by excellent fastness to heat, weather, cross-lacquering and to migration.

EXAMPLE 3

An amount of 42 g of N,N'-diaminoperylene-3,4,9,10-tetracarboxylic acid diimide is heated, with stirring, with 42.3 g of benzoyl chloride in 300 ml of 1,2,4-trichlorobenzene to 165° – 170°, and the whole maintained for 4 hours at this temperature. The red suspension is filtered off at 140°, and the residue washed first with 1,2-dichlorobenzene and then with dimethylformamide. The moist residue is again suspended with 200 ml of dimethylformamide, and the temperature raised for 30 minutes to 140°. After filtration and washing of the residue with alcohol and water, and then drying at 100°, 59 g of a product are obtained which is identical to the product described in Example 1.

An identical product is obtained by using, instead of 1,2,4-trichlorobenzene, 300 ml of o-dichlorobenzene, nitrobenzene or chloronaphthalene; or if condensation is performed within 1½ hours in 300 ml of dimethylformamide at 120°, within 40 hours in 300 ml of carbon tetrachloride at 78°, or within 20 hours in 300 ml of tetrachloroethane at 135°.

If, instead of benzoyl chloride, 34 g of benzoic acid anhydride are used, and condensation performed for 4 hours at 205°, then likewise is obtained, in good yield, the same crude pigment of the β-form.

EXAMPLE 4

33.6 g of N,N'-diaminoperylene-3,4,9,10-tetracarboxylic acid diimide are heated, with stirring, with 24.4 g of benzoic acid in 240 g of polyphosphoric acid to 120° – 125°, and the whole maintained at this temperature for 2 hours. The dark thick mass is then diluted at 100°, with external cooling, by the addition of 500 ml of water within 20 minutes. After further stirring for 30 minutes, the suspension is filtered off, and the red residue washed with water until neutral. After drying in vacuo at 60°, 45 g are obtained of a pure bluish red pigment possessing the same fastness properties as the pigment ground with salt, of Example 1.

An identical result is obtained by using, instead of benzoic acid, 30 g of benzoic acid ethyl ester.

In order to obtain a pigment of softer texture and having even better dispersibility, the residue, already washed with water, can be again suspended together with 0.3 g of the condensation product of 18 moles of ethylene oxide with cetyl alcohol, 3.6 g of lavryl alcohol, and 250 ml of water; and the mass dried at 60° in an evaporator with stirrer, and at 60° in vacuo.

EXAMPLE 5

An amount of 7.8 g of perylene-3,4,9,10-tetracarboxylic acid dianhydride is stirred with 8.15 g of benzhydrazide in a mixture of 35 ml of 1,2,4-trichlorobenzene and 35 ml of quinoline for 5 hours at 230° – 235°, whereby the water formed during the reaction is continuously distilled off. The red suspension is isolated as in Example 1. In this manner are obtained 11.7 g of a crude pigment of the β-form, the crude pigment being identical to that described in Example 1.

If the condensation is performed in 70 ml of 1,3,4-trichlorobenzene alone, or in a mixture of 66 ml of quinoline and 4 ml of 1,2,4-trichlorobenzene, then likewise is obtained a crude pigment of the β-form; if the condensation is performed, however, only in quinoline or in a mixture of 68 ml of quinoline and 2 ml of trichlorobenzene, a crude product of the α-form is obtained.

EXAMPLE 6

An amount of 8.4 g of N,N'-diaminoperylene-3,4,9,10-tetracarboxylic acid diimide is heated with 8.43 g of benzoyl chloride in 100 ml of o-dichlorobenzene in the presence of 2 ml of pyridine, with stirring, to 170°, and the whole maintained at this temperature for 3 hours. The red suspension is filtered off at 140°, and the residue is washed first with dimethylformamide, then with water, and finally with acetone. Thus obtained are 12 g of a crude pigment of the β-form, which is identical to that described in Example 1.

If, instead of pyridine, 0.2 g of anhydrous zinc chloride are used, then likewise are obtained 12 g of the crude pigment of the β-form.

On the other hand, if in this example are used, instead of 2 ml of pyridine, 8.05 ml of pyridine, i.e., the amount of pyridine equivalent to the benzoyl chloride used, or 2 g of $ZnCl_2$, then 12 g of a crude pigment of the α-form are obtained.

If an amount of 21 g of N,N'-diaminoperylene-3,4,9,10-tetracarboxylic acid diimide is mixed with 17 g of benzoyl chloride and 7.75 ml of pyridine, i.e., 0.8 mol pyridine per mol of benzoyl chloride, and added to 150 ml of o-dichloro-benzene, heated while stirring to 170° and the whole maintained at this temperature for 2 hours, a red suspension is obtained. Then this red suspension is filtered off at 100° and the residue is washed first with o-dichlorobenzene, then with methanol and water. Thus obtained, after dying, are 29.5 g of a product which is identical with the one described in Example 1.

EXAMPLE 7

An amount of 8.4 g of N,N'-diaminoperylene-3,4,9,10-tetracarboxylic acid diimide is stirred in 30 ml of benzoyl chloride for 5 hours at 127°–130°. The red suspension is diluted, after cooling, with 100 ml of chlorobenzene, filtered off, and the residue washed with chlorobenzene, dimethylformamide, and finally with acetone. Thus obtained, after drying, are 12 g of a crude product of the β-form.

If condensation is performed for 10 hours at 90°, then likewise is obtained a crude product of the β-form; if, on the other hand, it is performed for 3 hours at 160°, then a crude pigment of the α-form is obtained.

EXAMPLE 8

An amount of 8.4 g of N,N'-diaminoperylene-3,4,9,10-tetracarboxylic acid diimide is heated, with stirring, with 8.43 g of benzoyl chloride in 50 ml of quinoline to 90°–93°, and the whole maintained at this temperature for 20 hours. The suspension is filtered off, and the residue washed with chlorobenzene, dimethylformamide, water, and finally with acetone. Thus obtained are 11.8 g of a crude pigment of the β-form.

If condensation is performed above 120° in quinoline, then a crude pigment of the α-form is obtained.

EXAMPLE 9

An amount of 3 g of the crude pigment of the α-form produced according to Example 5 of the Belgian Patent 720 207 is heated in 50 g of polyphosphoric acid to 150°–155°, and the whole maintained at this temperature for 2 ½ hours. The mass is then diluted at 100°, with external cooling, by the addition of 50 ml of cold water within 10 minutes. After further stirring for 30 minutes, the suspension is filtered off, and the red residue washed with water until neutral. After drying in vacuo at 60°, 2.9 g of a bluish red pigment of the β-form are obtained.

If the polyphosphoric acid suspension is heated only to 120° – 125°, instead of to 150° – 155°, then a yellowish pigment of the α-form is obtained.

Example 10

An amount of 4 g of perylene-3,4,9,10-tetracarboxylic acid dibenzoyl hydrazide produced according to Example 1 and ground with salt, 36 g of aluminium hydroxide, 60 g of linseed oil varnish of medium viscosity, and 0.2 g of cobalt linoleate are mixed and ground on a three-roller mill. A printing ink is obtained which produces pure bluish red paper printings having excellent fastness to light.

EXAMPLE 11

To 100 g of a stoving lacquer consisting of 58.5 g of a 6 percent solution of a coconut-oil alkyd resin in xylene, 23 g of a 65 percent solution of a melamine-lacquer-resin in butanol, 17 g of xylene, and 1.5 g of butanol are added 1 g of the pigment produced according to Example 4 and 5 g of titanium dioxide. After 48 hours grinding of the mixture in a ball mill, the thus pigmented lacquer is sprayed onto a cleaned metal surface. The bluish red coating possesses, after stoving at 120°, very good fastness to light, cross-laquering, and weather.

EXAMPLE 12

6.7 g of polyvinyl chloride powder (suspension polymerisate), 33 g of dioctylphthalate, 2 g of dibutyl tin laurate, 0.3 g of a stabilizer based on phosphate, and 0.7 g of the pigment obtained according to Example 1 are mixed together and processed on mixing rollers at 160° for 15 minutes. On a calendering machine is then produced an 0.4 mm thick sheet. Its pure, deeply colored bluish red dyeing has fastness to heat, to migration, and to light.

What I claim is:

1. Crystalline perylenetetracarboxylic acid dihydrazide of formula I:

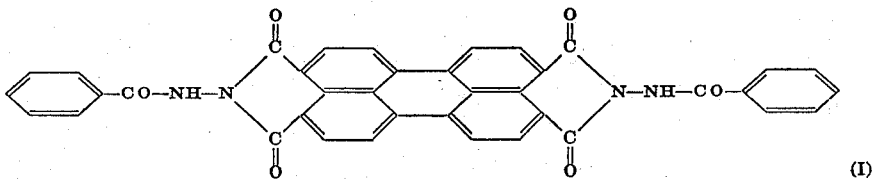

(I)

which has an X-ray spectrum with very strong lines at 3.31 A, 3.37 A, 5.72 A and 17.5 A, a very strong line at 4.375 A, medium lines at 3.65 A, 4.67 A and 7.315 A, medium-weak lines at 3.43 A, 3.92 A and 4.50 A, as well as weak lines at 3.01 A, 5.10 A, 6.56 A and 8.67 A.

* * * * *